United States Patent
Ma et al.

(10) Patent No.: US 11,150,970 B2
(45) Date of Patent: Oct. 19, 2021

(54) METHOD, ELECTRONIC DEVICE AND COMPUTER PROGRAM PRODUCT FOR EVALUATING HEALTH OF STORAGE DISK

(71) Applicant: EMC IP Holding Company LLC, Hopkinton, MA (US)

(72) Inventors: Chun Ma, Beijing (CN); Geng Han, Beijing (CN); Hongpo Gao, Beijing (CN); Jianbin Kang, Beijing (CN); Lifeng Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 169 days.

(21) Appl. No.: 16/367,368

(22) Filed: Mar. 28, 2019

(65) Prior Publication Data
US 2019/0332455 A1 Oct. 31, 2019

(30) Foreign Application Priority Data
Apr. 28, 2018 (CN) .......................... 201810400912.6

(51) Int. Cl.
*G06F 11/00* (2006.01)
*G06F 11/07* (2006.01)
*G06F 3/06* (2006.01)

(52) U.S. Cl.
CPC .......... *G06F 11/0727* (2013.01); *G06F 3/064* (2013.01); *G06F 3/0619* (2013.01); *G06F 3/0653* (2013.01); *G06F 3/0679* (2013.01); *G06F 11/0751* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 3,704,363 | A | * | 11/1972 | Salmassy | G06F 11/3485 714/704 |
| 7,653,840 | B1 | * | 1/2010 | Taylor | G06F 11/0727 714/47.2 |
| 8,078,918 | B2 | * | 12/2011 | Diggs | G06F 11/008 714/42 |
| 8,095,851 | B2 | * | 1/2012 | Diggs | G06F 11/1068 714/763 |
| 8,259,498 | B2 | * | 9/2012 | Yogev | G11C 29/76 365/185.09 |
| 8,745,449 | B2 | * | 6/2014 | Dreifus | G11C 29/76 714/47.3 |
| 9,141,457 | B1 | | 9/2015 | Ma et al. | |

(Continued)

*Primary Examiner* — Amine Riad
(74) *Attorney, Agent, or Firm* — BainwoodHuang

(57) ABSTRACT

Techniques involve: in response to a number of errors of an error type in a storage disk increasing, determining an adjustment rate for a health value of the storage disk based on a total usage time length of the storage disk, where a longer total usage time length corresponds to a higher adjustment rate, and the health value indicates a health condition of the storage disk with respect to the error type. The techniques further involve increasing the adjustment rate based on a total input/output (I/O) number of the storage disk, where a greater total number of I/Os corresponds to a greater increment. The techniques further involve adjusting the health value with the adjustment rate. Such techniques can improve the accuracy of evaluating the health condition of the storage disk.

17 Claims, 4 Drawing Sheets

(56) References Cited

U.S. PATENT DOCUMENTS

| | | | |
|---|---|---|---|
| 9,189,309 B1 | 11/2015 | Ma et al. | |
| 9,229,796 B1 | 1/2016 | Ma et al. | |
| 9,268,487 B2 * | 2/2016 | Gibbons | G06F 3/0653 |
| 2003/0123847 A1 * | 7/2003 | Yada | G11B 20/1879 |
| | | | 386/235 |
| 2009/0059413 A1 * | 3/2009 | Escobar | G11B 5/6064 |
| | | | 360/75 |
| 2011/0252289 A1 * | 10/2011 | Patapoutian | H03M 13/29 |
| | | | 714/763 |
| 2015/0025872 A1 * | 1/2015 | Peterson | G06F 11/008 |
| | | | 703/13 |
| 2015/0277797 A1 * | 10/2015 | Lv | G06F 3/061 |
| | | | 711/103 |
| 2016/0359683 A1 * | 12/2016 | Bartfai-Walcott | |
| | | | H04L 41/5009 |
| 2017/0269980 A1 * | 9/2017 | Gupta | G06F 3/0647 |
| 2018/0196718 A1 * | 7/2018 | Honda | G06F 11/0727 |

\* cited by examiner

METHOD, ELECTRONIC DEVICE AND COMPUTER PROGRAM PRODUCT FOR EVALUATING HEALTH OF STORAGE DISK

CROSS-REFERENCE TO RELATED APPLICATION(S)

This application claims priority to Chinese Patent Application No. CN201810400912.6, on file at the China National Intellectual Property Administration (CNIPA), having a filing date of Apr. 28, 2018, and having "METHOD, ELECTRONIC DEVICE AND COMPUTER PROGRAM PRODUCT FOR EVALUATING HEALTH OF STORAGE DISK" as a title, the contents and teachings of which are herein incorporated by reference in their entirety.

FIELD

Embodiments of the present disclosure generally relate to a computer system or storage system, and more particularly, to a method, an electronic device and a computer program product for evaluating health of storage disk.

BACKGROUND

In a storage system, a storage disk (e.g. a hard disk etc.) may have many types of errors. Generally, the errors of the storage disk may be represented with error codes of small computer system interface (SCSI). At present, a health management method for the storage disk is used to manage health condition of the storage disk, handle errors of the storage disk, and enable the storage disk to recover from the errors if possible. These health management methods could define a health value for the storage disk to indicate the health condition of the storage disk. When the health condition of the storage disk changes, the health value can be adjusted accordingly to indicate the change.

However, conventional health management methods are not designed specifically based on characteristics of the storage disk and factors considered when the health condition of the storage disk is evaluated are relatively simple. Therefore, in many occasions the conventional health management methods cannot evaluate the health condition of the storage disk accurately and effectively, thereby failing to meet the performance requirement of the storage system.

SUMMARY

Embodiments of the present disclosure relate to a computer-implemented method, an electronic device and a computer program product.

In a first aspect of the present disclosure, there is provided a computer-implemented method. The method includes: in response to a number of errors of an error type in a storage disk increasing, determining an adjustment rate for a health value of the storage disk based on a total usage time length of the storage disk, a longer total usage time length corresponds to a higher adjustment rate, and the health value indicates a health condition of the storage disk with respect to the error type. The method further includes: increasing the adjustment rate based on a total input/output (I/O) number of the storage disk, where a greater total number of I/Os corresponds to a greater increment. The method additionally includes: adjusting the health value with the adjustment rate.

In some embodiments, the method may further include: in response to presence of a burst error in the storage disk, reducing the adjustment rate.

In some embodiments, the error type may be a media error type, and the method further includes: increasing the adjustment rate based on a number of current bad blocks in the storage disk.

In some embodiments, increasing the adjustment rate based on a number of current bad blocks may include: obtaining an additional increment from the number of bad blocks using a monotonically increasing positive function; and increasing the adjustment rate with the additional increment.

In some embodiments, determining the adjustment rate based on the total usage time length may include: obtaining the adjustment rate from the total usage time length using a monotonically increasing positive function.

In some embodiments, the method may further include: in response to the health value indicating that deterioration of the health condition of the storage disk reaches a threshold, determining to perform a recovery operation on the storage disk.

In some embodiments, the method may further include: in response to a number of I/Os for the storage disk without an error of the error type reaching a threshold number, adjusting the health value to indicate an improvement of the health condition of the storage disk.

In some embodiments, the error type may include at least one of the following: a recoverable error type, a media error type, a hardware error type, a link error type, and a data error type.

In some embodiments, the storage disk includes a solid state disk.

In a second aspect of the present disclosure, there is provided an electronic device. The electronic device includes at least one processor and at least one memory containing computer program instructions. The at least one memory and the computer program instructions are configured to, together with the at least one processor, cause the electronic device to: in response to a number of errors of an error type in a storage disk increasing, determine an adjustment rate for a health value of the storage disk based on a total usage time length of the storage disk, where a longer total usage time length corresponds to a higher adjustment rate, and the health value indicates a health condition of the storage disk with respect to the error type. The at least one memory and the computer program instructions are configured to, together with the at least one processor, cause the electronic device to increase the adjustment rate based on a total number of I/Os for the storage disk, where a greater total number of I/Os corresponds to a greater increment. The at least one memory and the computer program instructions are configured to, together with the at least one processor, cause the electronic device to adjust the health value with the adjustment rate.

In some embodiments, the at least one processor and the computer program instructions are further configured to, together with the at least one processor, cause the electronic device to: in response to presence of a burst error in the storage disk, reduce the adjustment rate.

In some embodiments, the error type is a media error type, and the at least one processor and the computer program instructions are further configured to, together with the at least one processor, cause the electronic device to increase the adjustment rate based on a number of current bad blocks in the storage disk.

In some embodiments, the at least one processor and the computer program instructions are further configured to, together with the at least one processor, cause the electronic device to obtain an additional increment from the number of bad blocks using a monotonically increasing positive function; and increase the adjustment rate with the additional increment.

In some embodiments, the at least one processor and the computer program instructions are further configured to, together with the at least one processor, cause the electronic device to derive the adjustment rate from the total usage time length using a monotonically increasing positive function.

In some embodiments, the at least one processor and the computer program instructions are further configured to, together with the at least one processor, cause the electronic device to: in response to the health indicating that deterioration of the health condition of the storage disk reaches a threshold, determine to perform a recovery operation on the storage disk.

In some embodiments, the at least one processor and the computer program instructions are further configured to, together with the at least one processor, cause the electronic device to: in response to a number of I/Os for the storage disk without an error of the error type reaching a threshold number, adjust the health value to indicate an improvement of the health condition of the storage disk.

In some embodiments, the error type includes at least one of: a recoverable error type, a media error type, a hardware error type, a link error type, and a data error type.

In some embodiments, the storage disk includes a solid state disk.

In a third aspect of the present disclosure, there is provided a computer program product being tangibly stored on a non-volatile computer readable medium and including machine executable instructions which, when executed, cause a machine to perform steps of the method according to the first aspect.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

Throughout the drawings, the same or corresponding reference symbols refer to the same or corresponding parts.

DETAILED DESCRIPTION

Figure 1:
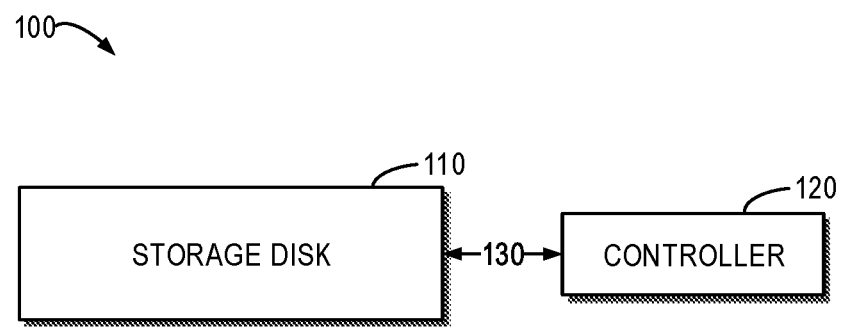
FIG. 1 is a schematic diagram illustrating a storage system in which embodiments of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles and spirits of the present disclosure will now be described with reference to various example embodiments illustrated in the drawings. It should be understood that description of those embodiments is merely to enable those skilled in the art to better understand and further implement example embodiments disclosed herein and not intended for limiting the scope disclosed herein in any manner.

FIG. 1 is a schematic diagram illustrating a storage system 100 in which the embodiments of the present disclosure can be implemented. As illustrated in FIG. 1, the storage system 100 includes a storage disk 110 and a controller 120 which may communicate via a communication link 130. For example, the controller 120 may obtain various information of the storage disk 110 via the communication link 130. Additionally or alternatively, the controller 120 may also obtain information about the storage disk 110 via other units or components (not shown) of the storage system 100.

On the other hand, the controller 120 may also transmit controlling information to the storage disk 110 via the communication link 130 so as to realize varies types of controls, managements and operations to the storage disk 110. It shall be understood that although the controller 120 shown in FIG. 1 is outside the storage disk 110, in some embodiments, the controller 120 may also be included in the storage disk 110 as a component thereof.

In some embodiments, the storage disk 110 may include various types of devices having a storage function, including but not limited to, a hard disk drive (HDD), a solid state disk (SSD), a removable disk, a compact disc read-only memory (CD ROM), a compact disk (CD), a laser disk, an optical disk, a digital versatile disk (DVD), a floppy disk and a blue-ray disk (BD), any other magnetic storage devices and any other optical storage devices or a combination thereof.

Likewise, the controller 120 may include any device that realizes control function, including but not limited to, a general-purpose processor, a microprocessor, a microcontroller, or a state machine. The controller 120 may also be implemented as a combination of computing devices, for instance, a combination of a digital signal processor (DSP) and a microprocessor, a plurality of microprocessors, one or more microprocessors in combination with a DSP core, or any other such configurations.

Besides, the communication link 130 may be any form of connection or coupling capable of realizing communications between the storage disk 110 and the controller 120, including but not limited to, a coaxial cable, an optical fiber cable, a twisted pair, or a wireless technology (e.g. an infrared technology, a radio technology and microwave technology). In some embodiments, the communication link 130 may include various types of buses.

It is to be understood that FIG. 1 only schematically illustrates units, modules or components in the storage system 100 associated with the embodiments of the present disclosure. In some other embodiments, the storage system 100 may further include other units, modules or components used for other functions (e.g., a storage array). Therefore, the embodiments of the present disclosure are not limited to the specific units, modules or components depicted in FIG. 1 but are generally applicable to any storage system including a storage disk and a controller.

As mentioned above, the controller of the storage disk may adopt a health management method to manage the health condition of the storage disk, handle errors of the storage disk, and enable the storage disk to recover from the errors. Generally, according to recovery characteristics in common, the health management method may divide errors of the storage disk into different error types.

The health management method may define a health value for each error type. For instance, the health value may be represented by a health ratio. The initial value of the health ratio may be set as zero, indicating that the storage disk is completely healthy. Once the storage disk has an error, the health ratio thereof will be increased to a certain value. When the health ratio of the storage disk reaches a predetermined threshold, the health management method may perform targeted health management for the storage disk. Besides, when the health ratio increases when there are errors happened in the storage disk, different errors cause the health ratio to be increased with different rates (also referred to as weights). Generally, the more serious the errors are, the higher the speed of increasing is, so as to increase the health ratio more quickly.

The inventor of the present disclosure finds that the conventional health management method is problematic in at least two aspects. On one hand, the conventional health management method is not specifically designed based on characteristics of the storage disk, but some types of storage disks (taking a solid state disk SSD as an example in the following) have special characteristics different from the conventional disks. This may be because the physical designs of these types of storage disks are different. For example, solid state disks have no errors caused by a magnetic head but may have chip errors which do not exist in conventional disks.

Based on the inventor's research, characteristics of errors in these types of storage disks are as the following. Taking a solid state disk as an example, the solid state disk is more reliable compared with a traditional disk but the occurrence of errors therein is closely related to the total usage time length and a number of bad blocks. Therefore, with an increase of the total usage time length of the solid state disk, its reliability decreases. Moreover, once there is a bad block in the solid state disk, there is very likely to be more bad blocks. In the case of a larger number of existing bad blocks, there are higher possibilities and speeds for new bad blocks to appear. However, the conventional health management method utilizes the same setting or configuration for all types of storage disks, which fails to provide an accurate and effective evaluation of health condition to various types of storage disks.

On the other hand, the factors being used to evaluate the health condition of a storage disk in the conventional health management method are comparatively simple. For example, only the number of input/outputs (I/Os) of the storage disk is considered. Besides, the speed at which the conventional health management method used to increase the health value is static, which also makes it impossible to provide an accurate and effective evaluation of the health condition for the storage disks of the above types. Particularly for a media error type, the possibility for an occurrence of the media error type each time may grow more quickly than the previous occurrence of media error type. However, the increase rate is configured to be linear in the conventional health management method, thus the health problem of storage disk is discovered too late for occurrences of media error type in the conventional method.

In view of the above problems and other potential problems existing in the conventional health management method, a computer-implemented method, an electronic device and a computer program product are provided according to some embodiments of the present disclosure. The reliability of a storage disk is represented based on error characteristics of the storage disk according to the embodiments of the present disclosure, so as to be better adapted to different types of storage disks, thereby improving the accuracy for evaluating the health condition of the storage disk. The embodiments of the present disclosure will be described as below with reference to the drawings.

Figure 2:
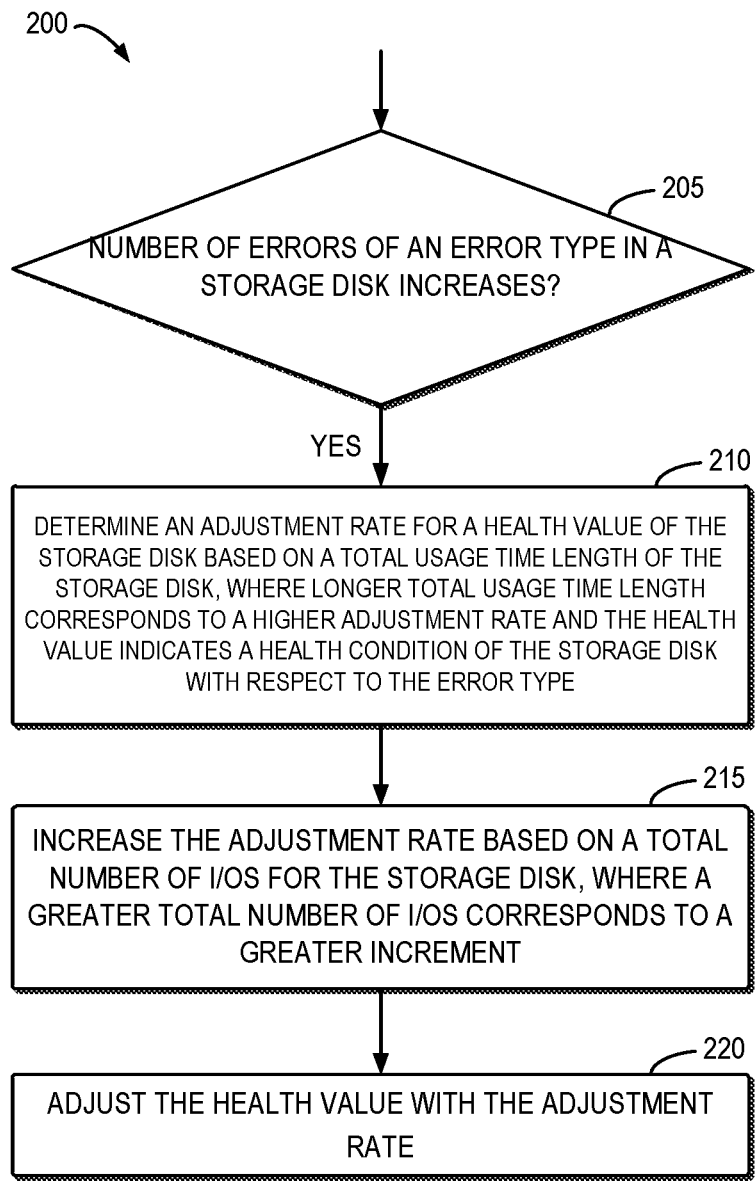
FIG. 2 is a flowchart illustrating a computer-implemented method according to some embodiments of the present disclosure.

FIG. 2 is a flowchart illustrating a computer-implemented method 200 according to some embodiments of the present disclosure. In some embodiments, the method 200 may be implemented by the controller 120, e.g. the processor or processing unit of the controller 120, or various functional modules of the controller 120 in the storage system 100. In some other embodiments, the method 200 may also be implemented by a computing device independent of the storage system 100, or other units in the storage system 100. For ease of illustration, the method 200 will be described with reference to FIG. 1.

At 205, the controller 120 determines whether the number of errors of an error type in the storage disk 110 increases. For example, in the storage system 100 shown in FIG. 1, the controller 120 may determine that the storage disk 110 has an error and the error belongs to the error type via the communication link 130. Additionally or alternatively, the controller 120 may also obtain such information from other units or components of the storage system 100.

As mentioned above, the error type in the storage disk 110 may, for instance, be represented with the SCSI error codes, and may include a recoverable error type, a media error type, a hardware error type, a link error type, a data error type and so on. In particular, the recoverable error type is related to most SCSI soft errors, the media error type refers to an error that can be fixed by remapping, the hardware error type indicates that there is a problem in the hardware of the storage disk, and the link error type means that there is a problem between the storage disk and a port, while the data error type denotes that data on the storage disk is corrupted and is not being aware of by the storage disk.

When the controller 120 determines that a number of errors of the error type in the storage disk 110 increases, it means that an error of a given type happens in the storage disk 110. Thus, the controller 120 may indicate the health condition of the storage disk 110 deteriorates by adjusting the health value, and the health value indicates the health condition of the storage disk 110 with regard to the error type. In order to adjust the health value, the controller 120 may first determine an adjustment rate for the health value.

In particular, referring back to FIG. 2, at 210, in response to the number of errors of the error type increases in the storage disk 110, the controller 120 determines, based on the total usage time length of the storage disk 110, the adjustment rate for the health value of the storage disk 110. As used herein, the total usage time length refers to the total time length that the storage disk 110 is used (e.g., powered on) regardless of whether it is operated, such as an I/O operation. In some embodiments, the health value may be represented with a health ratio which may be in the form of a percentage.

Generally, with the increase of the total usage time length of the storage disk 110, its reliability declines. To reflect this characteristic of the storage disk 110, a longer total usage time length may be made to correspond to a higher adjustment rate. That is, if the controller 120 determines at different times that the total usage time length of the storage disk 110 is 100 hours and 200 hours respectively, then compared with the total usage time length of 100 hours, the controller 120 may determine a higher adjustment rate based on the total usage time length of 200 hours to adjust the health value of the storage disk 110. It shall be understood that the above specific numerical values are only for illustration, and do not intend to limit the scope of the present disclosure in any manner. In other embodiments of the present disclosure, the above parameters may be of any other suitable values.

In some embodiments, in order to use a function to reflect a tendency of the reliability of the storage disk 110 decreasing with an increase of the total usage time length, the controller 120 may obtain an adjustment rate from the total usage time length using a monotonically increasing positive function. As an example, the function may include, but is not limited to, a linear function, a logarithmic function, a polynomial function, or any other forms of functions. In this way, a fit dependent relation of the reliability of the storage disk 110 on the total usage time length can be obtained by adjusting various parameters in the function, thereby evaluating the health condition of the storage disk 110 more accurately.

In addition, for the storage disk 110, with an increase of the total number of I/Os performed thereto, its reliability also decreases. In order to enable a change of the health value of the storage disk 110 to reflect this character, at 215, the controller 120 increases the adjustment rate based on the total number of I/Os for the storage disk 110, where a greater total number of I/Os corresponds to a greater increment. As a result, the controller 120 determines the adjustment rate in a more comprehensive way by considering both the total usage time length of the storage disk 110 and the total number of I/Os thereof.

At 220, the controller 120 adjusts the health value of the storage disk 110 with the obtained adjustment rate. For example, it is assumed that when an initial health value (e.g., the health ratio) of the storage disk 110 is 0%, which indicates that the storage disk 110 is completely healthy. The determined adjustment rate adds 5% for each occurrence of error. Then, in response to an occurrence of error of a type of the storage disk 110, the health ratio of the storage disk 110 for this error type may be adjusted by 5%. The adjusted health ratio indicates deterioration of the health condition of the storage disk 110 with respect to the error type. It shall be understood that the above specific numerical values are only for illustration, and do not intend to limit the scope of the present disclosure in any manner. In other embodiments of the present disclosure, the above parameters may take any other suitable values.

In some embodiments, in response to the health value indicating that the deterioration of the health condition of the storage disk 110 reaches a threshold, the controller 120 may determine to perform a recovery operation to the storage disk 110. For example, this kind of recovery operation may include, but is not limited to, resetting the storage disk 110, setting the remaining service life of the storage disk 100, performing a proactive backup for the data of the storage disk 110, determining that the storage disk 100 is corrupted, or replacing the storage disk 110, and so on. As such, it can be ensured that the performance of the storage system 100 is not affected by a decline of the reliability of the storage disk 100 thereby improving user experience. Moreover, it shall be understood that the threshold herein may be pre-configured based on a specific design requirement and a specific technical environment.

In some conditions, there is a large amount of errors of an error type occurred within a short period of time, and such errors are referred to as burst errors. A burst error generally results from temporary causes such as a contact of lines being poor. Therefore, when determining the adjustment rate for the health value of the storage disk 110, it would be desirable to eliminate an effect of burst errors. Therefore, in some embodiments, in response to a presence of a burst error in the storage disk 110, the controller 120 can reduce the adjustment rate for the health value so as to eliminate an adverse impact of the burst error on determination of the adjustment rate. For example, in the case where it is determined that there is a burst error, the controller 120 may reduce the adjustment rate for the health value by a predetermined fixed value.

As indicated above, for the media error type, some types of storage disks (for instance, a solid state disk) have additional characteristics different from a traditional storage disk. For example, for the media error type, the number of bad blocks is an important factor that affects the reliability of the solid state disk. When the number of bad blocks is a large enough, the reliability of the solid state disk deteriorates with acceleration. Therefore, when the error type is the media error type, the controller 120 increases the adjustment rate for the health value based on the number of current bad blocks in the storage disk 110. In this manner, it is possible to determine a severe deterioration of the health condition of the solid state disk before bad blocks in the storage disk 110 burst, so as to deal with or change the storage disk 110 that already becomes unreliable.

In some embodiments, the controller 120 obtains an additional increment from the number of bad blocks using a monotonically increasing positive function and increases the adjustment rate for the health value with this additional increment. This function reflects that the possibility of occurrence of bad blocks is positively correlated with the number of current bad blocks. The specific form of the function may include, but is not limited to, a linear function, a logarithmic function, a polynomial function, or any other forms of functions. In this way, a fit dependence of the reliability of the storage disk 110 on the number of bad blocks may be obtained by adjusting various parameters in the function, thereby evaluating the health condition of the storage disk 110 more accurately.

Moreover, if there is no error of an error type in multiple times of I/O operations of the storage disk 110, it means that the error type did not affect the health condition of the storage disk 110 in the past period of time, and therefore will not affect the health condition of the storage disk 110 in the following period of time. In this case, it would be advantageous to reduce the health value of the error type properly. Hence, in some embodiments, in response to the number of I/Os for the storage disk 110 without the type of error reaching a threshold number, the controller 120 may adjust the health value to indicate an improvement of the health condition of the storage disk 110. The controller 120 may configure different threshold numbers for different error types. As such, the service life of the storage disk 110 may be lengthened reasonably, thereby avoiding determining the available storage disk 110 prematurely as End-of-Life or in need of replacement.

Figure 3:
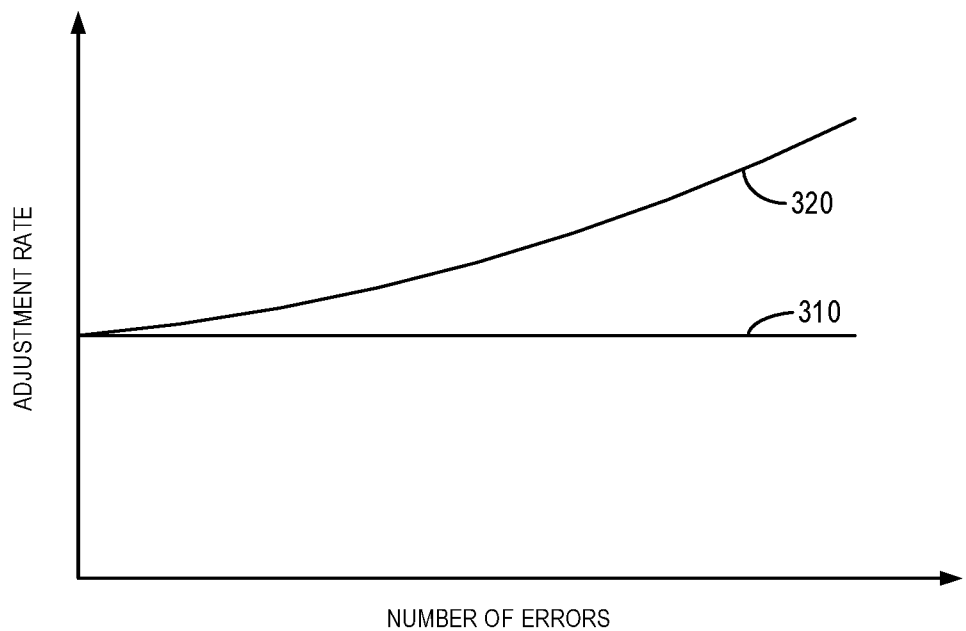
FIG. 3 is a relationship curve graph between simulated health value adjustment rate and number of errors according to some embodiments of the present disclosure.

FIG. 3 is a relationship curve graph between a simulated health value adjustment rate and the number of errors according to some embodiments of the present disclosure. As shown in FIG. 3, the horizontal axis schematically illustrates the number of errors of an error type while the vertical axis schematically shows the adjustment rate for the storage disk with respect to the health value of this error type. The curve 310 illustrates a variation curve of the adjustment rate with respect to the number of errors in accordance with the conventional health management method while the curve 320 illustrates a variation curve of the adjustment rate with respect to the number of errors in accordance with the embodiments of the present disclosure.

As can be seen from FIG. 3, compared with the conventional health management method using a static adjustment rate, the adjustment rate according to the embodiments of the present disclosure may have a greater value with the increase of the total usage time length. This is because more factors affecting the stability of the storage disk, such as the total usage time length and the number of bad blocks, are considered in the embodiments of the present disclosure. A higher adjustment rate enables the health value to increase more rapidly with the total usage time length, which reflects the characteristic of some types of storage disks (e.g. the solid state disk) whose stability deteriorates in acceleration with the increase of total usage time length. In practice, although the embodiments of the present disclosure have a higher adjustment rate, it is possible to avoid determining prematurely that the storage disk is corrupted with reasonably adjusting the initial value of the health value. Moreover, an actual rate value may be controlled by adjusting an increase range of the monotonically increasing positive function for the total usage time length and total number of I/Os.

Figure 4:
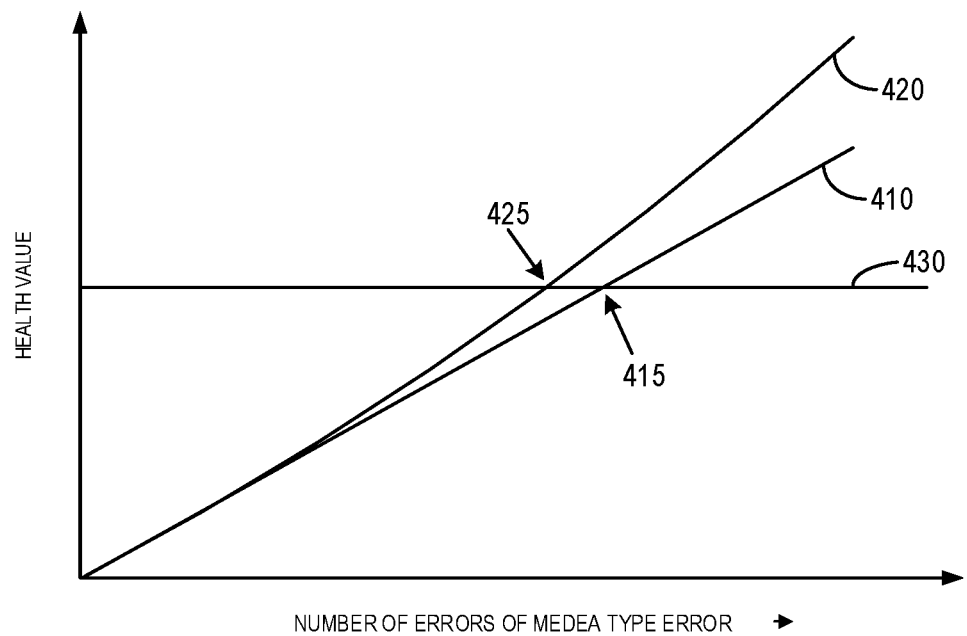
FIG. 4 is a relationship curve graph between a simulated health value and a number of errors of media error type according to some embodiments of the present disclosure.

FIG. 4 is a relationship curve graph between a simulated health value and the number of errors of media error type according to some embodiments of the present disclosure. As shown in FIG. 4, the horizontal axis schematically represents the number of errors of the media error type while the vertical axis schematically illustrates a health value of the storage disk with respect to the error type. The curve 410 represents a variation curve of the health value with respect to the number of errors in accordance with the conventional health management method, the curve 420 illustrates a variation curve of the health value with respect to the number of errors in accordance with embodiments of the present disclosure, and the curve 430 denotes a threshold line for the storage disk to be determined as corrupted. The intersection point 415 of the curve 410 and the curve 430 represents a corrupt point of the storage disk determined in accordance with the conventional health management method, while the intersection point 425 of the curve 420 and the curve 430 represents the corrupt point of the storage disk determined according to the embodiments of the present disclosure.

As can be seen from FIG. 4, since the embodiments of the present disclosure have a higher adjustment rate with the increase of the total usage time length and the number of bad blocks, the corrupt point 425 of the storage disk occurs earlier than the corrupt point 415 of the storage disk, which is better adapted to the error characteristics of some types of storage disks (for instance, solid state disk). For example, in the case that the solid state disk has a long enough usage time or has a sufficient number of media errors (reflecting that the number of bad blocks is larger enough), a rapid increase of the health value advantageously prevents a situation where the reliability of a solid state disk has declined below the threshold but is not noticed, and a chance for recovering the reliability of the solid state disk by performing a remedial operation (e.g. a proactive backup) is obtained.

Figure 5:
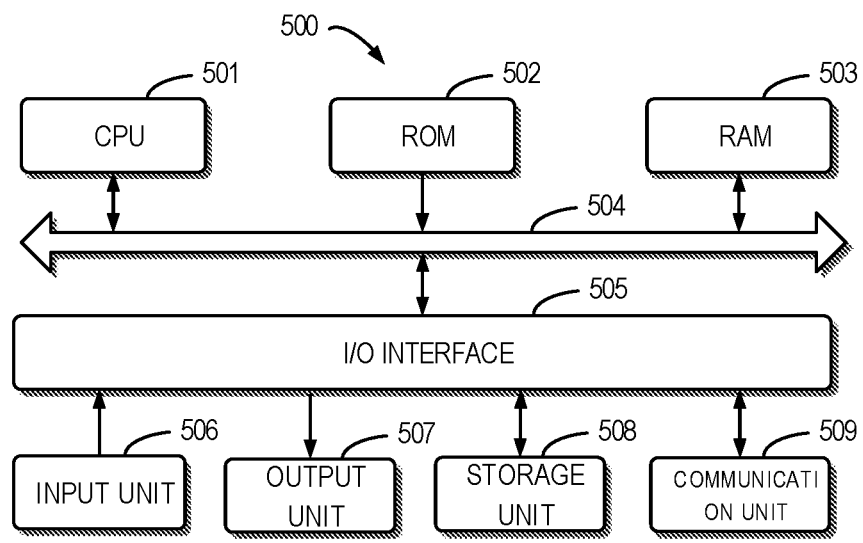
FIG. 5 is a schematic block diagram illustrating a device that may be used to implement embodiments of the present disclosure.

FIG. 5 schematically illustrates a block diagram of a device 500 that may be used to implement embodiments of the present disclosure. As shown in FIG. 5, the device 500 includes a central processing unit (CPU) 501 which can execute various appropriate actions and processing based on computer program instructions stored in a read-only memory (ROM) 502 or the computer program instructions loaded into a random access memory (RAM) 503 from a storage unit 508 (e.g., to form specialized circuitry). The RAM 503 also stores all kinds of programs and data required by operating the storage device 500. The CPU 501, ROM 502 and RAM 503 are connected to each other via a bus 504 to which an input/output (I/O) interface 505 is also connected.

A plurality of components in the device 500 are connected to the I/O interface 505, including: an input unit 506, such as a keyboard, a mouse and the like; an output unit 507, such as various types of displays, loudspeakers and the like; a storage unit 508, such as a magnetic disk, an optical disk and the like; and a communication unit 509, such as a network card, a modem, a wireless communication transceiver and the like. The communication unit 509 allows the device 500 to exchange information/data with other devices through computer networks such as Internet and/or various telecommunication networks.

Each procedure and processing as described above, such as the method 200, can be executed by the processing unit 501. For example, in some embodiments, the method 200 can be implemented as computer software programs, which are tangibly included in a machine-readable medium, such as the storage unit 508. In some embodiments, the computer program can be partially or completely loaded and/or installed to the device 500 via the ROM 502 and/or the communication unit 509. When the computer program is loaded to the RAM 503 and executed by the CPU 501, one or more steps of the above described method 200 are implemented.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one another embodiment." The terms "first", "second" and so on can refer to same or different objects. The following text can also include other explicit and implicit definitions.

As used in the text, the term "determine" covers various actions. For example, "determine" may include operating, calculating, processing, obtaining, examining, looking up (such as look up in a table, a database or another data structure), finding out and so on. Furthermore, "determine" may include receiving (e.g. receiving information), accessing (e.g. access data in the memory) and so on. Meanwhile, "determine" may include analyzing, choosing, selecting, establishing and the like.

It should be noted that the embodiments of the present disclosure can be realized by a hardware, a software or a combination of a hardware and a software, where the hardware part can be implemented by a special logic; the software part can be stored in a memory and executed by a suitable instruction execution system such as a microprocessor or a special-purpose hardware. Ordinary skilled in the art may understand that the above system and method may be implemented with computer executable instructions and/or in processor-controlled code which is provided on a carrier medium such as a programmable memory or a data bearer such as an optical or an electronic signal bearer.

Furthermore, although operations of the present methods are described in a particular order in the drawings, it does not require or imply that these operations are necessarily performed according to this particular sequence, or a desired outcome can only be achieved by performing all shown operations. On the contrary, the execution order for the steps as depicted in the flowcharts may vary. Alternatively, or in addition, some steps may be omitted, a plurality of steps may be merged into one step, and/or a step may be divided into a plurality of steps for execution. It will be noted that the features and functions of two or more units described above may be embodied in one unit. In turn, the features and functions of one unit described above may be further embodied in more units.

Although the present disclosure has been described with reference to various embodiments, it should be understood that the present disclosure is not limited to the disclosed embodiments. Various modifications and equivalent arrangements included in the spirit and scope of the appended claims is intended to be covered by the present disclosure.

We claim:

1. A computer-implemented method, comprising:
   maintaining a health value for an error type of a storage disk, the health value indicating a health condition of the storage disk with respect to the error type, the error type being one of a recoverable error type, a media error type, a hardware error type, a link error type, and a data error type;
   in response to occurrence of an error of the error type in the storage disk, (1) determining an adjustment rate for the health value of the storage disk based on a total usage time length of the storage disk, a longer total usage time length corresponding to a higher adjustment rate, (2) increasing the adjustment rate based on a total input/output (I/O) number of the storage disk, a greater total number of I/Os corresponding to a greater increment, and (3) adjusting the health value with the increased adjustment rate; and
   in response to the health value indicating that deterioration of the health condition of the storage disk reaches a threshold, performing a recovery operation on the storage disk.

2. The method of claim 1, further comprising:
   in response to presence of a burst error in the storage disk, reducing the adjustment rate.

3. The method of claim 1, wherein the error type is a media error type, the method further comprising:
   increasing the adjustment rate based on a number of current bad blocks in the storage disk.

4. The method of claim 3, wherein increasing the adjustment rate based on the number of current bad blocks comprises:
   obtaining an additional increment from the number of bad blocks using a monotonically increasing positive function; and
   increasing the adjustment rate with the additional increment.

5. The method of claim 1, wherein determining the adjustment rate based on the total usage time length comprises:
   obtaining the adjustment rate from the total usage time length using a monotonically increasing positive function.

6. The method of claim 1, further comprising:
   in response to a number of I/Os for the storage disk without an error of the error type reaching a threshold number, adjusting the health value to indicate an improvement of the health condition of the storage disk.

7. The method of claim 1, wherein the storage disk comprises a solid state disk.

8. The method of claim 1, wherein:
   a relationship between the adjustment rate and number of errors exhibits a variation in which the adjustment rate has a greater value with the increase of the total usage time.

9. The method of claim 8, wherein, based on the higher adjustment rate with the increase of the total usage time, a corrupt point of the storage disk is reached, and a corresponding rapid increase of the health value prevents a situation in which the reliability of the storage disk has declined below a threshold but is not noticed, and the reliability of the storage disk is recovered by performing a remedial operation.

10. An electronic device, comprising:
    at least one processor; and
    at least one memory containing computer program instructions, the at least one memory and the computer program instructions being configured to, together with the at least one processor, cause the electronic device to:
    maintain a health value for an error type of a storage disk, the health value indicating a health condition of the storage disk with respect to the error type, the error type being one of a recoverable error type, a media error type, a hardware error type, a link error type, and a data error type,
    in response to occurrence of an error of the error type in the storage disk, (1) determine an adjustment rate for the health value of the storage disk based on a total usage time length of the storage disk, a longer total usage time length corresponding to a higher adjustment rate, (2) increase the adjustment rate based on a total input/output (I/O) number of the storage disk, a greater total number of I/Os corresponding to a greater increment, and (3) adjust the health value with the increased adjustment rate; and
    in response to the health value indicating that deterioration of the health condition of the storage disk reaches a threshold, performing a recovery operation on the storage disk.

11. The electronic device of claim 10, wherein the at least one processor and the computer program instructions are further configured to, together with the at least one processor, cause the electronic device to:
    in response to presence of a burst error in the storage disk, reduce the adjustment rate.

12. The electronic device of claim 10, wherein the error type is a media error type, and the at least one processor and the computer program instructions are further configured to, together with the at least one processor, cause the electronic device to:

increase the adjustment rate based on a number of current bad blocks in the storage disk.

13. The electronic device of claim 12, wherein the at least one processor and the computer program instructions are further configured to, together with the at least one processor, cause the electronic device to:
   obtain an additional increment from the number of bad blocks using a monotonically increasing positive function; and
   increase the adjustment rate with the additional increment.

14. The electronic device of claim 10, wherein the at least one processor and the computer program instructions are further configured to, together with the at least one processor, cause the electronic device to:
   obtain the adjustment rate from the total usage time length using a monotonically increasing positive function.

15. The electronic device of claim 10, wherein the at least one processor and the computer program instructions are further configured to, together with the at least one processor, cause the electronic device to:
   in response to a number of I/Os for the storage disk without an error of the error type reaching a threshold number, adjust the health value to indicate an improvement of the health condition of the storage disk.

16. The electronic device of claim 10, wherein the storage disk comprises a solid state disk.

17. A computer program product having a non-transitory computer readable medium which stores a set of instructions to evaluate health of a storage disk; the set of instructions, when carried out by computerized circuitry, causing the computerized circuitry to perform a method of:
   maintaining a health value for an error type of a storage disk, the health value indicating a health condition of the storage disk with respect to the error type, the error type being one of a recoverable error type, a media error type, a hardware error type, a link error type, and a data error type;
   in response to occurrence of an error of the error type in the storage disk, (1) determining an adjustment rate for the health value of the storage disk based on a total usage time length of the storage disk, a longer total usage time length corresponding to a higher adjustment rate, (2) increasing the adjustment rate based on a total input/output (I/O) number of the storage disk, a greater total number of I/Os corresponding to a greater increment, and (3) adjusting the health value with the increased adjustment rate; and
   in response to the health value indicating that deterioration of the health condition of the storage disk reaches a threshold, performing a recovery operation on the storage disk.

* * * * *